(12) United States Patent
Gahleitner et al.

(10) Patent No.: US 8,344,069 B2
(45) Date of Patent: Jan. 1, 2013

(54) LOW EMISSION POLYMER COMPOSITION

(75) Inventors: Markus Gahleitner, Neuhofen/Krems (AT); Erwin Kastner, Linz (AT); Hartmut Siebert, Alkoven/Strassham (AT); Manfred Stadlbauer, Linz (AT)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/936,575

(22) PCT Filed: Apr. 8, 2009

(86) PCT No.: PCT/EP2009/002617
§ 371 (c)(1),
(2), (4) Date: Nov. 30, 2010

(87) PCT Pub. No.: WO2009/124753
PCT Pub. Date: Oct. 15, 2009

(65) Prior Publication Data
US 2011/0060085 A1   Mar. 10, 2011

(30) Foreign Application Priority Data

Apr. 10, 2008   (EP) ................................ 08007149

(51) Int. Cl.
C08F 8/00 (2006.01)
C08L 23/04 (2006.01)
C08L 23/10 (2006.01)

(52) U.S. Cl. ................................ 525/191; 525/240

(58) Field of Classification Search .................. 525/191, 525/240
See application file for complete search history.

(56) References Cited

U.S. PATENT DOCUMENTS 6,231,936 B1 * 5/2001 Kozimor et al. ............. 428/34.7
2011/0065873 A1   3/2011 Grein et al.

FOREIGN PATENT DOCUMENTS

| EP | 1 364 760 | 11/2003 |
|---|---|---|
| EP | 1 292 626 | 10/2004 |
| EP | 1 373 403 | 4/2005 |
| EP | 1 535 718 | 6/2005 |
| EP | 0 943 631 | 5/2006 |
| EP | 1 741 725 | 1/2007 |
| EP | 1 788 022 | 5/2007 |
| EP | 1 646 668 | 10/2007 |
| WO | WO 97/08238 | 3/1997 |
| WO | WO 2004/033509 | 4/2004 |
| WO | WO 2007/002435 | 1/2007 |

OTHER PUBLICATIONS

International Search Report mailed Jun. 23, 2009 for International application No. PCT/EP2009/002617.
Written Opinion mailed Jun. 23, 2009 for International application No. PCT/EP2009/002617.
Response to Written Opinion mailed Feb. 1, 2010 for International application No. PCT/EP2009/002617.
International Preliminary Report on Patentability mailed Jun. 28, 2010 for International application No. PCT/EP2009/002617.
Koch, et al., *Evaluation of scratch resistance in multiphase PP blends*, Polymer Testing 26 (2007), pp. 927-936.
Huneault, et al., *Effect of compounding conditions and composition on the performance of talc/ethylene-octene copolymer/polypropylene blends (TPO)*, Proc. SPE ANTEC 1998, vol. 1. pp. 7-11.

* cited by examiner

*Primary Examiner* — Nathan M Nutter
(74) *Attorney, Agent, or Firm* — Fay Sharpe LLP

(57) ABSTRACT

The present invention relates to a polymer composition comprising a polyolefin base resin comprising (A) a propylene homopolymer with a MWD of 1.5 to 5.0, and (B) an ethylene copolymer with one or more comonomers selected from alphaolefins with 4 to 12 carbon atoms, having a density of not greater than 920 kg/m$^3$ wherein the polyolefin base resin has a weight ratio of propylene homopolymer (A) to ethylene copolymer (B) from 95:5 to 60:40, the use of such a polymer composition for the manufacture of an injection molded article, an article produced from such a polymer composition, an article with a grained surface structure produced from such a polymer composition showing having a scratch resistance, determined as the difference of the luminance ΔL at a load of 10 N, of not more than 1 and a gloss at an angle of 60° of not more than 2.8%, and the use of a polymer composition for the production of such an article.

19 Claims, No Drawings

LOW EMISSION POLYMER COMPOSITION

The present invention relates to a polymer composition with low amounts of volatiles and fogging and good mechanical properties comprising a propylene homopolymer, an ethylene copolymer with one or more comonomers selected from alpha-olefins with 4 to 12 carbon atoms, and optionally an ethylene homopolymer. The present invention further relates to a process for preparing such a polymer composition and the use of such a polymer composition for preparing injection molded articles e.g. in automotive applications.

Due to their chemical and thermal resistance as well as mechanical strength polypropylenes are used in different applications such as molding applications, films, wires and cables or pipes. However, due to their high mechanical strength polypropylenes show a high stiffness which is not advantageous for the use as material for injection molded automotive applications.

It is known in the art to incorporate ethylene-propylene rubbers and ethylene propylene diene monomer rubbers in polypropylene compositions as impact modifiers. For impact modification also single-site based ethylene copolymers are used. EP 1 373 403 discloses a heterophasic propylene polymer comprising 60 to 90 wt % of a propylene homopolymer and 10 to 25 wt % of a single-site based ethylene copolymer. Further, Huneault et al., *Effect of compounding conditions and compositions on the performance of talc/ethylene-octene copolymer/polypropylene blends (TPO)*, Proc. SPE ANTEC 1998 Vol. 1, 7-11 describes the use of a metallocene-based ethylene-octene copolymer as an impact modifier for talc filled polypropylene.

Talc filled polypropylene is widely used in automobile and appliance applications. These composites have good surface quality, low shrinkage, high stiffness, good tensile properties and creep resistance.

Further key issues in automotive applications are low emissions as well as low amounts of volatile organic compounds (VOC) and fogging. Those VOCs are supposed to be produced during the extrusion or compounding step. Reducing emissions from the polymeric material applied in automobile interior is a general target for several years. This target has been pursued by applying purification steps in the production of the respective polymeric material (e.g. steam stripping, vacuum degassing and low input compounding) or by using special additives (e.g. high performance stabilizers and absorbers). Examples for such processes are disclosed in EP 1364760 A1 and EP 1535718 A1. These processes involve, however, increased investment cost and reduced output rates, deteriorating the economic situation of the resulting products.

Further important properties for material used in automotive interior application are scratch resistance and gloss. For improving scratch resistance EP 1 788 022 suggests to blend a propylene containing an ethylene-propylene copolymer with a very low intrinsic viscosity with a polypropylene having a density between 905 and 930 kg/m$^3$. However, those materials have a glossy surface which is not appreciated by automobile designers.

It is hence object of the present application to provide a polymer composition having good mechanical properties, in particular impact strength at low temperatures and flexural properties and at the same time showing greatly reduced amounts of volatiles, fogging and emissions without the need to use special compounding equipment and/or additives during the preparation of those compositions. Additionally, articles comprising the polymer composition should have a good scratch resistance combined with a low gloss.

The present invention resides in the finding that emissions and volatiles can be greatly diminished by using a propylene homopolymer with a MWD of 1.5 to 5.0. In order to achieve good mechanical properties, the propylene homopolymer is blended with an ethylene copolymer having a density of not greater than 920 kg/m$^3$ as impact modifier. It has surprisingly been found that such compositions show good impact and stiffness properties together with low levels of volatiles and emissions of the granulated compositions as well as of injection molded test specimen. Furthermore, the injection molded test specimen with a grained surface structure comprising such compositions show an improved scratch resistance to gloss balance.

The present invention therefore relates to a polymer composition comprising a polyolefin base resin comprising
(A) a propylene homopolymer with a MWD of 1.5 to 5.0, and
(B) an ethylene copolymer with one or more comonomers selected from alpha-olefins with 4 to 12 carbon atoms, having a density of not greater than 920 kg/m$^3$,
wherein the polyolefin base resin has a weight ratio of propylene homopolymer (A) to ethylene copolymer (B) from 95:5 to 60:40.

It has surprisingly be found that such a polymer composition shows low levels of emissions and volatiles, which can be seen in low emission and low amounts of VOC and fogging of the granulated compounds and the injection molded articles made from those compounds. At the same time good impact properties especially at low temperatures are achieved whereas the flexural properties are not affected negatively. Additionally, the optical properties in form of low gloss of the articles with a grained surface structure comprising the polymer composition of the present invention could have surprisingly been optimized by maintaining a excellent scratch resistance.

Component (A) may consist of a single propylene homopolymer, but may also comprise a mixture of different propylene homopolymers. This also applies for all preferred embodiments of component (A).

The same applies for component (B), i.e. it may consist of a single ethylene copolymer but may also comprise a mixture of different ethylene copolymers. This also applies for all preferred embodiments of component (B).

In one preferred embodiment, the polyolefin base resin consists of components (A) and (B).

Propylene homopolymer (A) preferably is present in an amount of 60 to 95 wt %, more preferably 61 to 90 wt %, most preferably 62 to 85 wt % based on the total polyolefin base resin.

It is preferred that component (A) has a weight average molecular weight Mw of 100 to 500 kg/mol, more preferably 150 to 350 kg/mol, and a number average molecular weight Mn of 20 to 200 kg/mol, more preferably 50 to 150 kg/mol, determined by GPC according to ISO 16014-1, and -4.

Component (A) has a MWD of 1.5 to 5.0, preferably 2.0 to 4.0, most preferably 2.2 to 3.5.

It is further preferred that propylene homopolymer (A) has a melt flow rate MFR (2.16 kg, 230° C.) of 2 to 200 g/10 min, more preferably of 5 to 50 g/10 min.

The MFR (2.16 kg, 230° C.) for polypropylene and the MFR (2.16 kg, 190° C.) for polyethylene is determined according to ISO 1133. Melt flow rate and average molecular weight are inversely related to each other, i.e. higher melt flow rate is equivalent to lower average molecular weight and vice versa. Further, the higher the melt flow rate, the lower the viscosity of the polymeric material.

It is especially preferred that the propylene homopolymer (A) has an amount of xylene cold solubles (XS) of not more than 2.0 wt %, preferably not more than 1.0 wt %.

It is furthermore especially preferred that the propylene homopolymer (A) has a melting point as determined by differential scanning calorimetry (DSC) of not more than 160° C., preferably not more than 155° C.

The propylene homopolymer (A) may be produced by a single- or multistage process polymerization of propylene such as bulk polymerization, gas phase polymerization, slurry polymerization, solution polymerization or combinations thereof preferably using a single site catalyst. A homopolymer can be made either in loop reactors or in a combination of loop and gas phase reactor. Those processes are well known to one skilled in the art.

A suitable catalyst for the polymerization of the propylene homopolymer is any stereospecific single-site catalyst for propylene polymerization which is capable of polymerizing propylene at a temperature of 40 to 110° C. and at a pressure from 10 to 100 bar. Suitable single-site catalysts are metallocene catalysts as described for example in EP 1741725 A1 and EP 0943631 A1.

The ethylene copolymer (B) preferably is present in an amount of 5 to 40 wt %, more preferably in an amount of 10 to 39 wt %, most preferably in an amount of 15 to 38 wt % based on the total polyolefin base resin.

Further, ethylene copolymer (B) has a density of not greater than 920 kg/m$^3$, preferably not greater than 905 kg/m$^3$, most preferably not greater than 895 kg/m$^3$.

It is further preferred that the density of component (B) is at least 865 kg/m$^3$, more preferably 870 kg/m$^3$, most preferably 875 kg/m$^3$.

It is preferred that component (B) has a weight average molecular weight Mw of 40 to 160 kg/mol, more preferably 60 to 120 kg/mol, and a number average molecular weight Mn of 10 to 80 kg/mol, more preferably 15 to 70 kg/mol, determined by GPC according to ISO 16014-1, and -4.

The ethylene copolymer (B) preferably has a MWD of 1.5 to 5.0, more preferably 2.0 to 4.0, most preferably 2.2 to 3.5.

It is further preferred that ethylene copolymer (B) has a melt flow rate MFR (2.16 kg, 190° C.) of at least 5.0 g/10 min, more preferably of at least 10.0 g/10 min.

Further, the melt flow rate MFR (2.16 kg, 190° C.) of component (B) is preferably not higher than 100 g/10 min, more preferably not higher than 50 g/10 min.

In a preferred embodiment, ethylene copolymer (B) has a comonomer content of 5 to 40 wt %, more preferably 7.5 to 30 wt %, most preferably 10 to 25 wt %, based on the total component (B).

The comonomers of component (B) are selected from alpha-olefins with 4 to 12 carbon atoms, preferably from a group consisting of 1-butene, 1-hexene, 4-methyl-1-pentene and 1-octene. Especially preferred are 1-hexene and 1-octene.

The ethylene copolymer (B) may be produced by a single- or multistage process polymerization of ethylene and alpha-olefins such as bulk polymerization, gas phase polymerization, slurry polymerization, solution polymerization or combinations thereof preferably using a single site catalyst. A copolymer can be made either in loop reactors or in a combination of loop and gas phase reactor. Those processes are well known to one skilled in the art.

A suitable catalyst for the polymerization of the ethylene homopolymer is any single-site catalyst for ethylene polymerisation which is capable of copolymerizing ethylene and comonomers at a temperature of 40 to 110° C. and at a pressure from 10 to 100 bar. Suitable single-sites are metallocene catalysts as described for example in EP 1646668 A1 and EP 1292626 A1.

The polyolefin base resin according to the present invention has a weight ratio of propylene homopolymer (A) to ethylene copolymer (B) from 95:5 to 60:40, preferably from 90:10 to 61:39 most preferably from 85:15 to 62:38.

Propylene homopolymer (A) and ethylene copolymer (B) together preferably are present in the polyolefin base resin in an amount of at least 80 wt %, more preferably at least 82 wt %, most preferably at least 84 wt % of the total polyolefin base resin.

The polyolefin base resin of inventive polymer composition may further comprise an ethylene homopolymer (C) in an amount of up to 15 wt %, based on the total polyolefin base resin, having a density of at least 940 kg/m$^3$, preferably of at least 950 kg/m$^3$.

Component (C) may consist of a single ethylene homopolymer, but may also comprise a mixture of different ethylene homopolymers. This also applies for all preferred embodiments of component (C).

It is preferred that the ethylene homopolymer (C) has a melt flow rate MFR (2.16 kg, 190° C.) of 0.2 to 200 g/10 min, preferably of 1 to 100 g/10 min, most preferably of 2 to 50 g/10 min.

The ethylene homopolymer (C) may be produced by a single- or multistage process polymerization of ethylene such as bulk polymerization, gas phase polymerization, slurry polymerization, solution polymerization or combinations thereof preferably using a conventional catalyst. A homopolymer can be made either in loop reactors or in a combination of loop and gas phase reactor. Those processes are well known to one skilled in the art.

A suitable catalyst for the polymerization of the ethylene homopolymer is any catalyst for ethylene polymerization which is capable of polymerizing ethylene at a temperature of 40 to 110° C. and at a pressure from 10 to 100 bar. Suitable catalysts are Ziegler Natta catalysts as well as metallocene catalysts.

Ethylene homopolymer (C) preferably is present in the polyolefin base resin in an amount of up to 15 wt %.

The polyolefin base resin of the inventive polymer composition preferably has a melt flow rate MFR (2.16 kg, 230° C.) of at least 4.5 g/10 min, more preferably of at least 6.0 g/10 min, still more preferably of at least 8.0 g/10 min, most preferably of at least 9.0 g/10 min.

The upper limit of the melt flow rate MFR (2.16 kg, 230° C.) of the polyolefin base resin of the inventive polymer composition is preferably 50 g/10 min, more preferably 25 g/10 min, still more preferably 20 g/10 min, most preferably 18 g/10 min.

In one preferred embodiment the polyolefin base resin of the inventive polymer composition does not comprise an ethylene homopolymer (C). In this embodiment the polymer composition preferably has a melt flow rate MFR (2.16 kg, 230° C.) of at least 13 g/10 min, preferably of at least 15 g/10 min.

In another preferred embodiment the polyolefin base resin of the inventive polymer composition comprises an ethylene homopolymer (C) in an amount of up to 15 wt %, preferably in an amount of 1.0 to 15 wt %, more preferably in an amount of 5.0 to 14 wt %, most preferably in an amount of 7.5 to 13 wt % based on the total of the polyolefin base resin. In this embodiment the polymer composition preferably has a melt flow rate MFR (2.16 kg, 230° C.) of less than 13 g/10 min, preferably of not greater than 12 g/10 min.

It is preferred that the polyolefin base resin is present in the polymer composition in an amount of at least 75 wt %, most preferably at least 77 wt %.

In all preferred embodiments the polymer composition of the invention may comprise at least one filler material (D) in an amount of up to 20 wt % based on the total polymer composition.

In one preferred embodiment the inventive polymer composition does not comprise a filler material (D).

In another preferred embodiment the polymer composition of the invention comprises at least one filler material (D) in an amount of 1 to 18 wt %, more preferably in an amount of 5 to 17 wt %, most preferably in an amount of 10 to 16 wt % based on the total polymer composition.

Component (D) preferably is an inorganic filler material. Suitable filler materials are talc, wollastonite, $CaCO_3$, $BaSO_4$, and mica.

It is preferred that component (D) has a particle size d97 (top cut) of 50 micrometer or less, preferably 25 micrometer or less measured by laser diffraction according to ISO 13320-1:1999. It is further preferred that component D has a specific surface (BET) of at least 5 $m^2/g$, preferably at least 9 $m^2/g$, determined according to ISO 787-11.

Moreover, the polymer composition of the invention may further contain various additives, such as miscible thermoplastics, antioxidants, UV-stabilizers, lubricants, demolding agents, nucleating agents, fillers, colouring agents, and foaming agents which can be added to the composition before, during or after the blending in an amount of up to 5.0 wt %, preferably up to 3.0 wt % based on the total polymer composition.

The compounds of the several embodiments of the invention are blended together. The blending step can be carried out by any suitable method known in the art, but preferably in a twin screw extruder with high intensity mixing segments and preferably at a temperature of 170 to 270° C., more preferably of 180 to 250° C., and at a throughput of 10 to 500 kg/h and a screw speed of 50 to 200 rpm.

It will be shown in the example section below that the polymer compositions according to the invention show greatly lower amount of volatiles, fogging and emission. At the same time good impact properties such as Charpy notched impact strength especially at low temperatures are achieved whereas the flexural properties in behalf of flexural modulus, flexural strength, flexural strain and flexural stress are not affected.

Thus, the inventive polymer compositions preferably have a content of volatiles of less than 45 micrograms Carbon equivalents/g, more preferably less than 40 micrograms Carbon equivalents/g, most preferably less than 38 micrograms Carbon equivalents/g, determined according to VDA 277.

Further, the polymer compositions according to the invention preferably have an amount of volatile organic compounds (VOC) of less than 100 micrograms toluene equivalents/g, more preferably less than 70 micrograms toluene equivalents/g, most preferably less than 50 micrograms toluene equivalents/g, determined according to VDA 278.

Additionally, the inventive polymer compositions preferably have an amount of fogging of less than 100 micrograms hexadecane equivalents/g, more preferably less than 80 micrograms hexadecane equivalents/g, most preferably less than 60 micrograms hexadecane equivalents/g, determined according to VDA 278.

It is preferred that the level of VOC and fogging do not significantly increase after injection molding of the blended and pelletized inventive compositions.

Further, the inventive polymer compositions preferably have a Charpy notched impact strength at +23° C. of at least 4.0 $kJ/m^2$, more preferably at least 5.0 $kJ/m^2$, most preferably 5.5 $kJ/m^2$, determined according to ISO 179-1 eA:2000.

Additionally, the inventive polymer compositions preferably have a Charpy notched impact strength at -20° C. of at least 1.0 $kJ/m^2$, more preferably at least 1.2 $kJ/m^2$, most preferably 1.5 $kJ/m^2$ determined according to ISO 179-1 eA:2000.

Moreover, the inventive polymer compositions preferably have a flexural strength of at least 20 MPa, more preferably of at least 25 MPa determined according to ISO 178.

Still further, the polymer compositions according to the invention preferably have a flexural modulus of at least 900 MPa, more preferably at least 950 MPa, determined according to ISO 178.

In a further aspect of the present invention the inventive polymer compositions can be used for the manufacture of an injection molded article, preferably in automotive applications. Those polymer compositions are especially suitable for automobile interior applications.

The present invention is further dedicated to an article comprising such a polymer composition. Such articles are preferably used in automotive applications.

Additionally, it has surprisingly been found that an article with a grained surface structure comprising the inventive polymer composition shows a high scratch resistance combined with low gloss.

The articles with a grained surface structure are preferably produced by moulding, more preferably by injection moulding and have an average grain size of preferably 0.01 to 5 mm, more preferably 0.05 to 2.5 mm, a grain depth of preferably 0.01 to 0.5 mm, more preferably 0.05 to 0.25 mm and a conicity of preferably 1° to 10°, more preferably 3° to 8°. It is further preferred that those articles with a grained surface structure comprise carbon black in an amount of up to 5 wt %, more preferably in an amount of 0.1 to 3 wt %.

The article with a grained surface structure, preferably as defined above, comprising the polymer composition according to the invention has a scratch resistance, determined as the difference of the luminance ΔL at a load of 10 N of not more than 1, preferably not more than 0.7, still more preferably not more than 0.5, most preferably not more than 0.3. The lower limit of the scratch resistance usually is -0.5.

At the same time the article with a grained surface structure comprising the polymer composition according to the invention has a gloss at an angle of 60° of not more than 2.8%, preferably of not more than 2.7% and most preferably of not more than 2.6%. The lower limit of the gloss usually is 0%.

In a preferred embodiment the article with a grained surface structure consists of the inventive polymer composition.

Thus, the present invention is further dedicated to the use of a polymer composition for the production of an article with a grained surface, preferably as defined above, having a scratch resistance, determined as the difference of the luminance ΔL at a load of 10 N, of not more than 1 preferably not more than 0.7, still more preferably not more than 0.5, most preferably not more than 0.3 and a gloss at an angle of 60° of not more than 2.8%, preferably of not more than 2.7% and most preferably of not more than 2.6%. In a preferred embodiment an injection molded article with a grained surface, typically in automotive applications having such superior scratch resistance and gloss behavior is produced. Preferred polymer compositions in this regard are those of the present invention.

In the following the present invention is further illustrated by means of examples.

EXAMPLES

1. Definitions:

a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg, the $MFR_5$ of polyethylene is measured at a temperature 190° C. and a load of 5 kg and the $MFR_2$ of polyethylene at a temperature 190° C. and a load of 2.16 kg.

b) Density

The density is measured according to ISO 1183 on compression molded specimens.

c) Weight Average Molecular Weight and MWD

The weight average molecular weight Mw and the molecular weight distribution (MWD =Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 µl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725

In case of PE the constants are: K: $39 \times 10^{-3}$ ml/g and a: 0.725 d) Differential Scanning Calorimetry (DSC)

DSC is run according to ISO 3146/part 3/method C2 in a heat/cool/heat cycle with a scan rate of 10° C./min in the temperature range of +23 to +210° C. Crystallization temperature and enthalpy are determined from the cooling step, while melting temperature and enthalpy are determined from the second heating step.

e) Determination of Xylene Soluble Fraction (XS)

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

XS %=(100×m×Vo)/(mo×v); mo=initial polymer amount (g); m=weight of residue (g); Vo=initial volume (ml); v=volume of analysed sample (ml).

f) Particle size (d97) and specific surface (BET)

The particle size d97 (top cut) is calculated from the particle size distribution measured by laser diffraction according to ISO 13320-1:1999. The specific surface (BET) is determined according to ISO 787-11.

g) Charpy Notched Impact Strength

Charpy impact strength was determined according to ISO 179-1eA:2000 on V-notched samples of $80 \times 10 \times 4$ mm$^3$ at 23° C. (Charpy notched impact strength (23° C.)), and −20° C. (Charpy notched impact strength (−20° C.)). The test specimens were prepared by injection molding using an IM V 60 TECH machinery in line with ISO 1872-2. The melt temperature was 200° C. and the mold temperature was 40° C.

h) Flexural Modulus and Flexural Strength

The flexural modulus and flexural strength, strain and stress were determined according to ISO 178. The test specimens having a dimension of $80 \times 10 \times 4.0$ mm$^3$ (length×width×thickness) were prepared by injection molding according to EN ISO 1873-2. The length of the span between the supports was 64 mm, the test speed was 2 mm/min and the force was 100 N.

i) Emission of Volatiles

The content of volatiles is determined according to VDA 277:1995 using a gas chromatography (GC) device with a WCOT-capillary column (wax type with 0.25µ film thickness) of 0.25 mm inner diameter and 30 m length. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

j) VOC/Fog Emission

The VOC/Fog emission is measured according to VDA 278:2002 on injection molded test specimen and on the granulated compounds. The volatile organic compounds are measured in toluene equivalents per gram. The fogging is measured in hexadecane equivalents per gram.

The measurements were carried out with a TDSA supplied by Gerstel using helium 5.0 as carrier gas and a column HP Ultra 2 of 50 m length and 0.32 mm diameter and 0.52 µm coating of 5% Phenyl-Methyl-Siloxane.

The VOC-Analysis is done according to device setting 1 listed in the standard using following main parameters: flow mode splitless, final temperature 90° C.; final time 30 min, rate 60 K/min. The cooling trap was purged with a flow-mode split 1:30 in a temperature range from −150° C. to +280° C. with a heating rate of 12 K/sec and a final time of 5 min. The following GC settings were used for analysis: 2 min isothermal at 40° C.

heating at 3 K/min up to 92° C., then at 5 K/min up to 160° C., and then at 10 K/min up to 280° C., 10 minutes isothermal; flow 1.3 ml/min.

The fog analysis is done according to device setting 1 listed in the standard using following main parameters: flow-mode splitless, rate 60 K/min; final temperature 120° C.; final time 60 min. The cooling trap was purged with a flow-mode split 1:30 in a temperature range from −150° C. to +280° C. with a heating rate of 12 K/sec. The following GC-settings were used for analysis: isothermal at 50° C. for 2 min, heating at 25 K/min up to 160° C., then at 10 K/min up to 280° C., 30 minutes isothermal; flow 1.3 ml/min.

k) Scratch Resistance

To determine the scratch resistance a Cross Hatch Cutter Model 42Op, manufactured by Erichsen, was used.

For the tests, plaques of $70 \times 70 \times 4$ mm size were cut from a molded grained plaque of size $140 \times 200 \times 4$ mm (grain parameters average grain size=1 mm, grain depth=0.12 mm, conicity=6°). The minimum period between injection molding of specimens and scratch-testing was 7 days.

For testing the specimens must be clamped in a suitable apparatus as described above. Scratches are applied at a force of 10 N using a cylindrical metal pen with a ball shaped end (radius=0.5 mm±0.01). A cutting speed of 1000 mm/min is used.

A minimum of 20 scratches parallel to each other are brought up at a load of 10 N with a distance of 2 mm. The application of the scratches is repeated perpendicular to each other, so that the result is a scratching screen. The scratching direction shall be unidirectional.

The scratch resistance is reported as the difference of the luminance ΔL of the unscratched from the scratched areas. ΔL can be measured using a spectrophotometer that fulfils the requirements to DIN 5033.

Measured ΔL values must be below a maximum of 1.5.

A detailed test description of the test method can be found in the article "Evaluation of scratch resistance in multiphase PP blends" by Thomas Koch and Doris Machl, published in POLYMER TESTING 26 (2007), p. 927-936.

l) Gloss

Gloss was determined on the test specimen prepared above under item (k) according to DIN 67530 at an angle of 60°.

2. Materials a) Polypropylene Homopolymer (PP-A-1)

Catalyst

A metallocene catalyst as described in example 1 of EP 1741725 A1 was used for the preparation of the PP homopolymer PP-A-1.

Polymerisation

The PP homopolymer PP-A-1 has been produced in a Borstar PP pilot plant as follows: The catalyst was fed together with triethylaluminium as cocatalyst with a Al/Zr ratio [mol/mol] of 911. The first polymerization step was carried out in a loop reactor at a temperature of 35° C. and a pressure of 5470 kPa feeding propylene with 200 ppm of hydrogen. The resulting polymer was transferred without special separation from the process gas to the subsequent reactors. A second polymerization step was carried out in a gas phase reactor at a temperature of 65° C. and a pressure of 5290 kPa, respectively feeding further propylene with 200 ppm hydrogen. After deactivation of the catalyst with steam and drying of the resulting polymer powder with warm nitrogen, the resulting polypropylene homopolymer was compounded together with 0.07 wt % Calcium Stearate and 0.60% Irganox B225 (antioxidant combination supplied by Ciba Specialty Chemicals) in a twin screw extruder at 230 to 250° C.

The resulting PP homopolymer has an MFR (2.16 kg, 230° C.) of 7.1 g/10 min, a density of 902 kg/m$^3$, a melting point of 150° C. and an XS content of 0.7 wt %. The GPC determination resulted in a weight average molecular weight (Mw) of 260 kg/mol, a number average molecular weight (Mn) of 105 kg/mol and a MWD (Mw/Mn) of 2.5.

b) Propylene Homopolymer HD905CF (PP-A-2)

HD905CF is a Ziegler-Natta based propylene homopolymer with a density of 905 kg/m$^3$, an MFR (2.16 kg, 230° C.) of 8 g/10 min, a melting point of 166° C. and an XS content of 1.2 wt %. It is distributed by Borealis.

c) Ethylene Copolymer EXACT® 8230 (PE-B)

EXACT® 8230 is a metallocene-based ethylene-octene copolymer with a density of 880 kg/m$^3$ and an MFR (2.16 kg, 190° C.) of 30 g/10 min. It is distributed by DEX Plastomers.

d) Ethylene Homopolymer MG9641B (PE-C)

MG9641B is an ethylene homopolymer with a density of 964 kg/m$^3$ and an MFR (2.16 kg, 190° C.) of 8 g/10 min. It is distributed by Borealis.

e) Propylene Homopolymer HC001A (PP-D)

HC001A is a propylene hompolymer with a density of 905 kg/m$^3$ and an MFR (2.16 kg, 230° C.) of 3.2 g/10 min. It is distributed by Borealis.

f) Mineral Filler (Tital® 15)

Tital® 15 is a talc filler material with a particle size d97 (top cut) of 21 μm and a specific surface (BET) of 10 m$^2$/g, distributed by Ankerpoort NV.

g) Antioxidants (Irganox 1010, Irgafos 168)

Irganox 1010 (Cas No. 6683-19-8) and Irgafos 168 (Cas No. 31570-04-4) both are distributed by Ciba Specialty Chemicals.

h) UV stabilizers (Tinuvin 770, Chimassorb 119)

Tinuvin 770 (Cas No. 52829-07-9) and Chimassorb 119 (Cas No. 106990-43-6) both are distributed by Ciba Specialty Chemicals.

i) Carbon Black (CB)

PLASBLAK PE4103 is a polyethylene based masterbatch for injection molding applications containing carbon black. It is distributed by Cabot Corporation.

j) Erucamide (ESA)

Incroslip C is used as erucamide (Cas No. 112-84-5), distributed by Croda Chemical.

3. Compositions

The components were blended according to Tables 1 and 2 in a twin screw extruder (PRISM TSE24 L/D ratio 40) with two high intensity mixing segments at temperatures between 190 and 240° C. at a throughput of 10 kg/h and a screw speed of 50 rpm. The material was extruded to two circular dies of 3 mm diameter into a water bath for strand solidification and then pelletized and dried.

TABLE 1

Polymer compositions containing PP-A-1

|  | CE1 | Ex1 | Ex2 | Ex3 | Ex4 |
|---|---|---|---|---|---|
| PP-A-1 [wt %] | 98.8 | 82.8 | 67.8 | 57.8 | 52.8 |
| PE-B [wt %] | — | 15.0 | 15.0 | 15.0 | 30.0 |
| PE-C [wt %] | — | — | — | 10.0 | — |
| PP-D [wt %] | 0.74 | 0.74 | 0.74 | 0.74 | 0.74 |
| Tital 15 [wt %] | — | — | 15.0 | 15.0 | 15.0 |
| CB [wt %] | — | 1.0 | 1.0 | 1.0 | 1.0 |
| Irgafos 168 [wt %] | 0.05 | 0.05 | 0.05 | 0.05 | 0.05 |
| Irganox 1010 [wt %] | 0.10 | 0.10 | 0.10 | 0.10 | 0.10 |
| Tinuvin 770 [wt %] | 0.08 | 0.08 | 0.08 | 0.08 | 0.08 |
| Chimassorb 119 [wt %] | 0.08 | 0.08 | 0.08 | 0.08 | 0.08 |
| ESA [wt %] | 0.15 | 0.15 | 0.15 | 0.15 | 0.15 |

TABLE 2

Polymer compositions containing PP-A-2

|  | CE2 | CE3 | CE4 | CE5 | CE6 |
|---|---|---|---|---|---|
| PP-A-2 [wt %] | 98.8 | 82.8 | 67.8 | 57.8 | 52.8 |
| PE-B [wt %] | — | 15.0 | 15.0 | 15.0 | 30.0 |
| PE-C [wt %] | — | — | — | 10.0 | — |
| PP-D [wt %] | 0.74 | 0.74 | 0.74 | 0.74 | 0.74 |
| Tital 15 [wt %] | — | — | 15.0 | 15.0 | 15.0 |
| PE4103 [wt %] | — | 1.0 | 1.0 | 1.0 | 1.0 |
| Irgafos 168 [wt %] | 0.05 | 0.05 | 0.05 | 0.05 | 0.05 |
| Irganox 1010 [wt %] | 0.10 | 0.10 | 0.10 | 0.10 | 0.10 |
| Tinuvin 770 [wt %] | 0.08 | 0.08 | 0.08 | 0.08 | 0.08 |
| Chimassorb 119 [wt %] | 0.08 | 0.08 | 0.08 | 0.08 | 0.08 |
| ESA [wt %] | 0.15 | 0.15 | 0.15 | 0.15 | 0.15 |

The polymer compositions were tested on the level of volatiles and emissions as well as on their mechanical properties which are listed in Table 3.

By maintaining good mechanical properties in impact strength and flexural properties the inventive examples show excellently low emissions and volatiles. It can further be seen that injection molding of the inventive polymer compositions does not increase the amount of volatile organic compounds and the amount of fogging.

Furthermore, the injection molded test specimens with a grained surface structure prepared from the inventive polymer compositions according to item (k) in the method section show low gloss indicating a matt surface while maintaining a high scratch resistance as shown in Table 3.

TABLE 3

Properties of the polymer compositions

|  | CE1 | Ex1 | Ex2 | Ex3 | Ex4 | CE2 | CE3 | CE4 | CE5 | CE6 |
| --- | --- | --- | --- | --- | --- | --- | --- | --- | --- | --- |
| $MFR_2$ (230° C.) [g/10 min] | 6.8 | 9.7 | 9.3 | 11.1 | 16.5 | 6.3 | 8.9 | 9.1 | 11.1 | 16.2 |
| Content Volatiles on granulated compositions [μgC/g] | 36 | 35 | 32 | 31 | 31 | 84 | 67 | 57 | 56 | 48 |
| VOC on granulated compositions [μgTE/g] | 12 | 22 | 17 | 35 | 28 | 121 | 183 | 158 | 173 | 189 |
| VOC on injection molded test specimen [μgTE/g] | 12 | 29 | 21 | 32 | 31 | 179 | 364 | 231 | 206 | 232 |
| Fogging amount on granulated compositions [μgHD/g] | 15 | 22 | 27 | 56 | 27 | 233 | 257 | 221 | 200 | 202 |
| Fogging amount on injection molded test specimen [μgHD/g] | 23 | 26 | 31 | 46 | 42 | 244 | 295 | 242 | 213 | 210 |
| Flexural Modulus [MPa] | 1350 | 1009 | 1751 | 1611 | 1003 | 2052 | 1492 | 2209 | 2062 | 1252 |
| Flexural Strength [MPa] | 39.2 | 29.3 | 36.0 | 32.7 | 23.1 | 54.1 | 39.8 | 43.1 | 40.0 | 27.5 |
| Flexural Strain [%] | 6.9 | 6.8 | 6.3 | 6.4 | 6.6 | 6.5 | 6.5 | 6.1 | 6.2 | 6.6 |
| Flexural Stress [MPa] | 32.6 | 24.3 | 32.0 | 28.8 | 19.7 | 46.7 | 34.0 | 38.8 | 35.7 | 23.5 |
| Charpy NIS (23° C.) [kJ/m$^2$] | 1.9 | 7.7 | 6.3 | 6.7 | 26.0 | 2.1 | 8.1 | 5.7 | 5.9 | 24.1 |
| Charpy NIS (−20° C.) [kJ/m$^2$] | 1.5 | 1.6 | 2.0 | 2.1 | 3.9 | 1.4 | 1.6 | 2.1 | 2.0 | 3.8 |
| Scratch Resistance [ΔL] | n.d. | −0.1 | 0.3 | 0 | −0.3 | n.d. | −0.1 | 0.3 | 0.2 | 0.1 |
| Gloss 60° [%] | n.d. | 2.5 | 2.4 | 2.6 | 2.5 | n.d. | 3.4 | 2.9 | 3.0 | 3.0 | n.d. = not determined

The application is further characterized by the following clauses:
1. Polymer composition comprising
   a polyolefin base resin comprising
   (A) a propylene homopolymer with a MWD of 1.5 to 5.0, and
   (B) an ethylene copolymer with one or more comonomers selected from alpha-olefins with 4 to 12 carbon atoms, having a density of not greater than 920 kg/m$^3$
   wherein the polyolefin base resin has a weight ratio of propylene homopolymer (A) to ethylene copolymer (B) from 95:5 to 60:40.
2. Polymer composition according to clause 1 wherein component (A) and component (B) together are present in an amount of at least 80 wt % of the total polyolefin base resin.
3. Polymer composition according to clause 1 or 2 wherein component (A) has an weight average molecular weight Mw of 100 to 500 kg/mol, measured by GPC according to ISO 16014-1, and -4.
4. Polymer composition according to any of the preceding clauses wherein component (A) has a MFR (2.16 kg, 230° C.) of 2 to 200 g/10 min, measured according to ISO 1133.
5. Polymer composition according to any of the preceding clauses wherein component (A) has a melting point as determined by differential scanning calorimetry (DSC) of not more than 160° C.
6. Polymer composition according to any of the preceding clauses wherein component (A) has an amount of xylene cold solubles (XS) of not more than 2.0 wt %.
7. Polymer composition according to any of the preceding clauses wherein component (A) has been polymerized in the presence of a single-site catalyst.
8. Polymer composition according to any of the preceding clauses wherein component (B) has an weight average molecular weight Mw of 40 to 160 kg/mol, measured by GPC according to ISO 16014-1, and -4.
9. Polymer composition according to any of the preceding clauses wherein component (B) has a MWD of 1.5 to 5.0.
10. Polymer composition according to any of the preceding clauses wherein component (B) has a MFR (2.16 kg, 190° C.) of at least 5.0 g/10 min, measured according to ISO 1133.
11. Polymer composition according to any of the preceding clauses wherein component (B) has a comonomer content of 5 to 40 wt % based on the total component (B).
12. Polymer composition according to any of the preceding clauses wherein the comonomers of component (B) are selected from a group consisting of 1-butene, 1-hexene, 4-methyl-1-pentene and 1-octene.
13. Polymer composition according to any of the preceding clauses wherein component (B) has been polymerized in the presence of a single-site catalyst.
14. Polymer composition according to any of the preceding clauses wherein the polyolefin base resin further comprises an ethylene homopolymer (C) having a density of at least 940 kg/m$^3$ in an amount of up to 15 wt % based on the total polyolefin base resin.
15. Polymer composition according to any of the preceding clauses wherein component (C) has a MFR (2.16 kg, 190° C.) of 0.2 to 200 g/10 min, measured according to ISO 1133.
16. Polymer composition according to any of the preceding clauses wherein the polyolefin base resin is present in the polymer composition in an amount of at least 75 wt %.
17. Polymer composition according to any of the preceding clauses wherein the composition further comprises at least one filler material (D) in an amount of up to 20 wt %.
18. Polymer composition according to clause 17 wherein component (D) is an inorganic filler material.
19. Polymer composition according to clause 17 or 18 wherein component (D) is selected from talc, wollastonite, $CaCO_3$, $BaSO_4$ and mica.

20. Polymer composition according to clauses 17 to 19 wherein component (D) has a particle size d97 (top cut) of 50 micrometer or less, measured by laser diffraction according to ISO 13320-1:1999.
21. Polymer composition according to any of the preceding clauses wherein the polyolefin composition has a content of volatiles of less than 45 micrograms Carbon equivalents/g, measured according to VDA 277.
22. Polymer composition according to any of the preceding clauses wherein the polyolefin composition has an amount of volatile organic compounds of less than 100 micrograms toluene equivalents/g, measured according to VDA 278.
23. Polymer composition according to any of the preceding clauses wherein the polyolefin composition has an amount of fogging of less than 100 micrograms hexadecane equivalents/g, measured according to VDA 278.
24. The use of a polymer composition according to the clauses 1 to 23 for the manufacture of an injection molded article.
25. Use according to clause 24 for the manufacture of an injection molded article in automotive applications.
26. Article produced from a polymer composition according to clauses 1 to 23.
27. Article according to clause 26 wherein the articles are used in automotive applications.

The invention claimed is:

1. A polymer composition comprising a polyolefin base resin comprising
   (A) a propylene homopolymer with a MWD of 1.5 to 5.0, and
   (B) an ethylene copolymer with one or more comonomers selected from alpha-olefins with 4 to 12 carbon atoms, having a density of not greater than 920 kg/m$^3$,
   wherein the polyolefin base resin has a weight ratio of propylene homopolymer (A) to ethylene copolymer (B) from 95:5 to 60:40,
   component (A) has an amount of xylene cold solubles (XS) of not more than 2.0 wt %, and
   the polyolefin composition has a content of volatiles of less than 45 micrograms Carbon equivalents/g, measured according to VDA 277.

2. The polymer composition according to claim 1 wherein component (A) has a MFR (2.16 kg, 230° C.) of 2 to 200 g/10 min, measured according to ISO 1133.

3. The polymer composition according to claim 1 wherein component (A) has a melting point as determined by differential scanning calorimetry (DSC) of not more than 160° C.

4. The polymer composition according to claim 1 wherein component (B) has a MWD of 1.5 to 5.0 and a weight average molecular weight Mw of 40 to 160 kg/mol, measured by GPC according to ISO 16014-1, and -4.

5. The polymer composition according to claim 1 wherein component (B) has a MFR (2.16 kg, 190° C.) of at least 5.0 g/10 min, measured according to ISO 1133.

6. The polymer composition according to claim 1 wherein component (B) has a comonomer content of 5 to 40 wt % based on the total component (B) and the comonomers of component (B) are selected from a group consisting of 1-butene, 1-hexene, 4-methyl-1-pentene and 1-octene.

7. The polymer composition according to claim 1 wherein component (B) has been polymerized in the presence of a single-site catalyst.

8. The polymer composition according to claim 1 wherein the polyolefin base resin further comprises an ethylene homopolymer (C) having a density of at least 940 kg/m$^3$ in an amount of from greater than zero to 15 wt % based on the total polyolefin base resin.

9. The polymer composition according to claim 1 wherein the composition further comprises at least one filler material (D) in an amount of from greater than zero to 20 wt %.

10. The polymer composition according to claim 9 wherein component (D) is an inorganic filler material and is selected from talc, wollastonite, $CaCO_3$, $BaSO_4$ and mica.

11. The polymer composition according to claim 1 wherein the polyolefin composition has an amount of volatile organic compounds of less than 100 micrograms toluene equivalents/g and an amount of fogging of less than 100 micrograms hexadecane equivalents/g, measured according to VDA 278.

12. An article produced from a polymer composition according to claim 1.

13. An article with a grained surface structure, having a scratch resistance ΔL of not more than 1, determined as the difference of the luminance of the unscratched from the scratched areas in a cross hatch test with the scratches being applied using a cylindrical metal pen with a ball shaped end having a radius of 0.5 mm±0.01 at a force of 10 N and the distance of the scratches being 2 mm, and a gloss at an angle of 60° of not more than 2.8%, determined according to DIN 67530, comprising a polymer composition according to claim 1.

14. The polymer composition according to claim 1, wherein component (A) has been polymerized in the presence of a single-site catalyst.

15. The polymer composition of claim 1, wherein component (A) has a MWD of 2.0 to 4.0.

16. The polymer composition of claim 1, wherein component (A) has a MWD of 2.2 to 3.5.

17. The polymer composition of claim 1, wherein component (A) comprises a mixture of different propylene homopolymers.

18. The polymer composition of claim 1, wherein component (B) comprises a mixture of different ethylene copolymers.

19. The polymer composition of claim 1, wherein component (B) has a MWD of 2.2 to 3.5.

* * * * *